United States Patent

Van Der Sluis et al.

[11] Patent Number: 5,905,590
[45] Date of Patent: May 18, 1999

[54] OPTICAL SWITCHING DEVICE COMPRISING SWITCHABLE HYDRIDES

[75] Inventors: Paul Van Der Sluis; Martin Ouwerkerk; Peter A. Duine, all of Eindhoven, Netherlands

[73] Assignee: U.S. Philips Corporation, New York, N.Y.

[21] Appl. No.: 08/916,772

[22] Filed: Aug. 20, 1997

[30] Foreign Application Priority Data

Sep. 5, 1996 [EP] European Pat. Off. .............. 96202471

[51] Int. Cl.⁶ .................. G02F 1/153; G02F 1/15
[52] U.S. Cl. ............................. 359/275; 359/265
[58] Field of Search .................. 359/275, 265, 359/251, 269

[56] References Cited

U.S. PATENT DOCUMENTS 5,635,729  6/1997  Griessen et al. ..................... 257/2
5,740,287  4/1998  Scalora et al. ........................ 385/6

FOREIGN PATENT DOCUMENTS

WO9638759  5/1996  WIPO .

*Primary Examiner*—Georgia Epps
*Assistant Examiner*—Suzanne Letendre
*Attorney, Agent, or Firm*—John C. Fox

[57] ABSTRACT

A description is given of a switching device (1) comprising a transparent substrate (3), a switching film (5) including hydrides of gadolinium or other trivalent metal, and magnesium, covered with a palladium layer (7). By exchange of hydrogen, the switching film can be reversibly switched from a transparent state to a mirror-like state with zero transmission via an intermediate black absorbing state. The conversion between both states is reversible, and this phenomenon can be used, for example, in an optical switching element or sun roof.

10 Claims, 2 Drawing Sheets

OPTICAL SWITCHING DEVICE COMPRISING SWITCHABLE HYDRIDES

BACKGROUND OF THE INVENTION

The invention relates to an optical switching device comprising a switching film which contains a metal compound. The invention also relates to an electrochemical switching device comprising such a switching film. The invention additionally relates to applications of such a switching device.

In the relevant switching devices, the optical properties are governed by external influences, such as gas pressure, an electric potential or current.

For example, electrochromic devices are well-known, in which a layer of an electrochromic material, such as $MoO_3$, is sandwiched between two transparent electroconductive electrode layers, for example, of indium-tin oxide. A layer of an $H^+$- or $Li^+$-ion-conducting material is present between an electrode and the electrochromic material. The device also comprises an ion-storage layer for storing said ions. The application of an electric potential of several volts across the electrodes causes the transmission or colour of the layer stack to change. Said transmission change is reversible. Electrochromic materials are used, for example, in variable-transmission windows for buildings and anti-dazzle mirrors in cars.

A drawback of oxidic electrochromic devices is that an extensive layer stack is required for their operation. A further important disadvantage is that such materials enable only a relative small transmission change, and hence a small contrast, to be attained.

In the non-prepublished international patent application wo 96/38759 filed by Applicants, a switching device is described in which a film of gadolinium hydride $GdH_x$ can be reversibly switched between a low-hydrogen ($x<\sim2$) composition and a supersaturated high-hydrogen ($x>\sim2$) composition by an exchange of hydrogen. Both compositions have different optical properties. At a low hydrogen content ($x<\sim2$), the film has a metallic character, and is non-transparent. At a high hydrogen content ($x>\sim2$), the film is semiconductive, transparent and yellow in the transmission mode. Switching can be carried out at room temperature.

OBJECTS AND SUMMARY OF THE INVENTION

It is an object of the present invention to provide, inter alia, an optical switching device in which the switching film can be reversibly converted from a nontransparent or mirror-like state into a transparent state with an improved contrast, i.e. a large ratio between the transmission values in both states. Another object is to provide an optical switching device in which the colour in the transparent state is neutral-grey. A further object is to provide an optical switching device which shows three stable states: mirror-like, absorbing or opaque, and transparent. Moreover, it must be possible to perform said conversion relatively rapidly at ambient temperature and pressure, and, within an electrochemical device, at low voltages, i.e. less than 10V.

In accordance with the invention, this object is achieved by an optical switching device comprising a substrate and a switching film which comprises hydrides of a trivalent metal and magnesium, which hydrides can be reversibly switched from a low-hydrogen, mirror-like composition to a supersaturated high-hydrogen transparent composition by an exchange of hydrogen.

It has been found that the addition of magnesium to the trivalent metal, such as gadolinium, has some surprising effects on the switching film.

The addition of magnesium leads to an increase in transmission of the switching film in the transparent state and to a decrease in transmission in the nontransparent state to almost zero. It means that the contrast, which is the ratio between both transmission values, increases. The addition of e.g. 50 at. % Mg to a Gd-film causes the contrast to increase from a value of 20 to a value of 3000. In the following part of this document, atomic percentages of magnesium in the switching layer are expressed as a percentage of the total metal content, i.e. excluding the hydrogen content.

The addition of magnesium also makes the switching film more transparent at shorter wavelengths. The addition of 50 at. % Mg to a Gd-containing switching film causes a shift of the absorption edge of the transmission spectrum 100 nm to shorter wavelengths. It means that the switching film in the transparent state can be made neutral grey, whereas a gadolinium film without the addition of Mg is yellow in the transparent state. The shift to shorter wavelengths increases with the quantity of Mg added to the switching film. Up to 95 at. % Mg may be added to the switching film. The presence of a trivalent metal is, even in a small amount, essential. Moreover, the addition of Mg to the switching film leads to a real mirror-like appearance in the non-transparent state, whereas a switching film without the addition of Mg is absorbing and black in said non-transparent state.

The addition of relatively small quantities of Mg, i.e. 5 to 15 at. %, to the switching film leads to an increase of the switching speed from the mirror-like to the transparent state.

The addition of more than 60 at. % Mg to a switching film containing Gd results in three stable states which are governed by the hydrogen content of the switching film, namely, as the hydrogen content increases: a mirror-like state, a black absorbing state, and a transparent state.

Apart from Gd, other trivalent transition and rare earth metals, and alloys of these metals, exhibit similar phenomena. Amongst these metals are e.g. lutetium (Lu), yttrium (Y) and lanthanum (La).

Instead of an alloy of a trivalent metal and magnesium, a stack of alternating thin layers of a trivalent metal and Mg may be used, e.g. a multilayer stack of 50 Mg | Gd pairs. Such a multilayer has the additional advantage of increasing the switching speed between the optical states.

Switching of the switching film takes place with hydrogen. The transmission of the switching film is governed by the hydrogen content: the transmission increases as the hydrogen content increases. If molecular hydrogen gas is supplied to the switching film, the transmission increases as the hydrogen pressure increases. The hydrogen must be dissociated to atomic H. The rate of dissociation can be increased by providing the surface of the switching film with a thin layer of palladium having a thickness, for example, of 5 nm. At said thickness, the palladium layer is discontinuous. The layer thickness is not critical and is chosen to be in the range between 2 and 25 nm. Thin layers of 2 to 10 nm are preferred, however, because the thickness of the palladium layer determines the maximum transmission of the switching device. In addition, the palladium layer protects the underlying switching film against oxidation.

Apart from palladium, other catalytically active metals which promote hydrogen dissociation, such as platinum, nickel and cobalt, or alloys with these metals, can be provided on the switching film.

The molecular hydrogen can be passed from a gas cylinder filled with $H_2$ to the switching film at room temperature in a simple manner. A low-hydrogen-content mirror-like switching film then changes to a transparent hydrogen-rich state. This conversion is reversible: the transparent film is converted to a mirror-like state by heating and/or evacuation of hydrogen. Said reversible conversion can take place around room temperature, or higher temperatures.

Atomic hydrogen can also be obtained in other ways, such as by electrolytic reduction of water at the switching film in accordance with the following reaction:

$H_2O + e^- \rightarrow H + OH^-$

Atomic hydrogen can additionally be generated from a hydrogen plasma. In this case, a catalytically active layer, for example, of palladium is not necessary. Atomic hydrogen can also originate from another metal hydride, such as metal alloys for hydrogen storage, which are known per se.

The switching film in accordance with the invention is thin, i.e. its film thickness is less than 2 μm. The film thickness of the switching film preferably ranges between 100 and 1,000 nm. As hydrogen must diffuse in the switching film, the film thickness determines the rate of full conversion from the mirror-like to the transparent state, and conversely.

The object of the invention, i.e. to provide an optical device which can be switched electrochemically, is achieved by a device comprising a first and a second electrode separated by an ion-conducting electrolyte, the first electrode comprising a switching film of hydrides of a trivalent metal and magnesium, which switching film is provided with an electrocatalytic metal layer in contact with the electrolyte, so that by applying a potential or current between the electrodes a change in optical transmission of the switching layer is detectable when the hydride is electrochemically converted from a low-hydrogen-content mirror-like state to a hydrogen-rich transparent state by an exchange of hydrogen, and vice versa.

The optical switching device according to this embodiment of the invention is an electrochemical cell, in which one of the electrodes comprises a switching film of hydrides of the trivalent metal and magnesium, which film is in contact with a ion-conducting electrolyte via a thin catalytic metal layer. The switching film is loaded with hydrogen by electrolytic reduction of protons, or a hydrogen-containing species, such as water, or by oxidation of $H^-$-ions, by applying a potential between the electrodes. At this electrode/electrolyte interface e.g. water is reduced to atomic hydrogen. The generated atomic hydrogen (HI) will cause a conversion from the mirror-like state to the transparent state. Changing the potential leads to oxidation of the transparent state into the mirror-like state. In this way a reversible electro-optical switch is obtained.

In order to increase the rate of hydriding and dehydriding, and thus the switching speed, the metal-hydride-containing switching film is provided with a thin layer of an electrocatalytic metal or alloy, such as palladium, platinum or nickel. These metals catalyse inter alia the reduction of protons to hydrogen. Other suitable catalytic metals are the alloys of the so called $AB_2$ and $AB_5$ types, such as $TiNi_2$ and $LaNi_5$. In addition, this metal layer protects the underlying switching film against corrosion by the electrolyte. As explained herein above, this layer has a thickness in the range between 2 and 25 nm. Thin layers of 2 to 10 nm are preferred, however, because the thickness of the film determines the maximum transmission of the switching device.

The electrolyte must be a good ion conductor, but it must be an isolator for electrons in order to prevent self-discharge of the device. As an electrolyte liquid, use can be made of electrolytes, such as an aqueous solution of KOH. Such a solution is a good ion conductor, and the metal hydrides are stable in it. The electrolyte may also be present in the gel or solid state.

Use is most preferably made of transparent solid-state electrolytes, because of the simplicity of the device; they prevent sealing problems, and the device is easier to handle. Both solid inorganic and organic compounds can be used. Examples of inorganic electrolytes, which are good proton ($H^+$) conductors, are hydrated oxides such as $Ta_2O_5 \cdot nH_2O$, $Nb_2O_5 \cdot nH_2O$, $CeO_2 \cdot nH_2O$, $Sb_2O_5 \cdot nH_2O$, $Zr(HPO_4)_2 \cdot nH_2O$ and $V_2O_5 \cdot nH_2O$, $H_3PO_4(WO_3)_{12} \cdot 29H_2O$, $H_3PO_4(MoO_3)_{12} \cdot 29H_2O$, $[Mg_2Gd(OH)_6]OH \cdot 2H_2O$ and anhydrous compounds such as $KH_2PO_4$, $KH_2AsO_4$, $CeHSO_4$, $CeHSeO_4$, $Mg(OH)_2$ and compounds of the type $MCeO_3$ (M=Mg, BA, Ca, Sr), in which a part of CE has been subsituted by Yb, Gd or Nb. Also glasses may be used, such as alkali-free zirconium phosphate glass. Examples of good ion ($H_3O^+$) conductors are $HUO_2PO_4 \cdot 4H_2O$ and oxonium β-alumina. Examples of good $H^-$-ion conductors are $CaCl_2/CaH_2$, $Ba_2NH$ and $SrLiH_3$. An example of a solid organic electrolyte is poly(2-acrylamido-2-methyl-propane-sulphonic acid).

Various transparent materials can be used for the counter or second electrode. Examples are hydrogenated oxidic materials such as $TiO_2$, $WO_3$, $NiO_2$, $Rh_2O_3$ and $V_2O_5$. Said materials can be loaded with hydrogen, by sputtering in a hydrogen atmosphere, or electrochemically in a separate step. Also thin layers of hydride-forming intermetallic $AB_2$ and $AB_5$ compounds, such as $TiNi_2$ and $LaNi_5$, can be used. Another possibility is the use of the same material as that used for the switching film, which results in the formation of a symmetrical switching device. Said materials are provided in the form of a layer with a thickness comparable to that of the switching film. The thickness is chosen in such a way that the hydrogen capacity in the second electrode is sufficient to convert the switching film from the mirror-like state to the transparent state, and vice versa.

Substrates onto which the layers of the switching device may be provided are transparent materials, such as glass, quartz, diamond, aluminium oxide or (flexible) synthetic resin. The substrate may be plane or curved.

The switching film is applied as a thin layer onto the substrate by means of conventional methods such as vacuum evaporation, sputtering, laser ablation, chemical vapour deposition or electroplating. In this respect, it is important that during and after application of the switching layer, the metal of the switching film is not subject to oxidation. In a vacuum-evaporation process, this is achieved by maintaining the pressure, in particular, of the residual gases water and oxygen, at a low level below $10^{-6}$ to $10^{-7}$ mbar. By subjecting the trivalent metal and magnesium to hydrogen at a pressure of $10^{-2}$ mbar, the metals in the switching film can be converted to the hydride state with a low hydrogen content, which film has a mirror-like appearance and is non-transparent.

The catalytically active layer, for example, of Pd, and the layer of the second electrode, can likewise be applied by means of one of the above-mentioned methods.

The inorganic solid-state electrolyte can also be applied as a thin layer by one of the above-mentioned methods. Inorganic oxidic electrolytes may also be manufactured by a sol-gel process, starting from a suitable alkoxy compound. Organic electrolytes may be applied e.g. by spin coating.

As thin films of metal hydrides have a sufficient electrical conductance, a thin transparent layer of indium-tin oxide (ITO) between the substrate and the switching layer, which is usual in conventional electrochromic devices, may be omitted. In this way, the switching device according to the invention is simpler than a conventional electrochromic display.

An example of a possible layer sequence in an electrochemical optical switching device according to the invention is:

substrate|GdMgH$_x$|Pd|KOH|TiOOH$_y$|ITO

In this configuration, GdMgH$_x$ is initially in the low-hydrogen, mirror-like state (x<~2), whereas the tungsten oxide is loaded with hydrogen: TiOOH$_y$ (0<y≦1). The TiOOH$_y$ layer, which serves as the second electrode, is transparent. When a negative potential is applied to the GdMgH$_x$ film, OH$^-$ions and H$_2$O are transferred through the electrolyte, and H$_2$O is reduced at the GdMg$_x$ film. By this electrochemical reaction GdMgH$_x$ is converted to GdMgH$_{x+\delta}$ (hydrogen-rich, transparent state; x+δ>~2), which is transparent and neutral grey, whereas TiOOH$_{y-\delta}$ remains transparent: the device has become transparent in this state, or is switched from the mirror-like state to the transparent state, provided the Pd layer is transparent. The switching process is reversible. When a positive potential is applied to the GdMgH$_{x+\delta}$ film, this film loses hydrogen and the device becomes mirror-like and non-transparent again. This switching process can be repeated many times and takes place at a low voltage below 10 V.

By virtue of switching from a mirror-like, non-transparent state to a transparent state, optionally via an absorbing black state, and conversely, the switching device in accordance with the invention can be used in many applications. By virtue of this optical effect, the switching device can be used as an optical switching element, for example as a variable beam splitter, optical shutter, and for controlling the illuminance or the shape of light beams in luminaires. Dependent upon the film thickness of the switching film, this film can exhibit almost zero transmission in the mirror-like state. This enables a switching device having a great contrast to be manufactured. The switching device can also be used for data storage and in optical computing, and in applications such as architectural glass, vision control glass, sun roofs and rear-view mirrors. In the mirror-like state not only visible light is reflected, but also radiant heat or infrared light, so that such a switching device can also be used for climate control.

The switching device in accordance with the invention can also be used as a variable transmission filter on or in front of a display screen to improve the contrast of the picture.

By making a pattern in the metal-hydride layer, a thin display can be manufactured. The construction of such a display is much simpler than that of an LCD (liquid crystal display) due to the absence of an LC layer, orientation layer, retardation layer and polarization filter. By using three different trivalent metals, a three-colour dot pattern can be obtained.

These and other aspects of the invention will be apparent from and elucidated with reference to the embodiments described hereinafter.

EXEMPLARY EMBODIMENT 1

DESCRIPTION OF THE PREFERRED EMBODIMENTS

Figure 1:
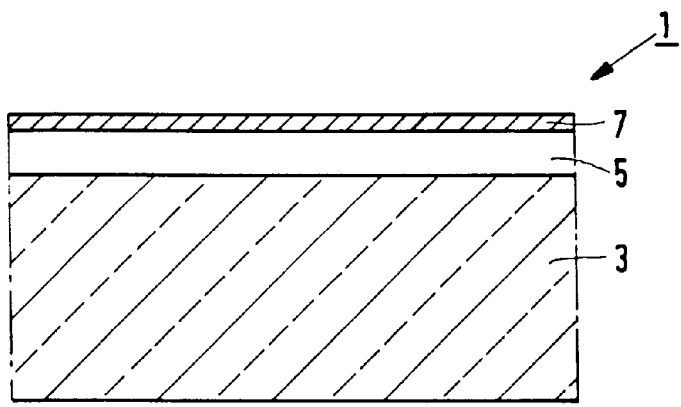
FIG. 1 is a schematic cross-sectional view of an optical switching device in accordance with the invention.

FIG. 1 is a schematic, cross-sectional view of a switching device 1 in accordance with the invention. The layer thicknesses are not drawn to scale. A switching film 5 in the form of a 200 nm thick film of a GdMg-alloy containing 20 at. % Mg (Gd$_{80}$Mg$_{20}$) is provided on a polished, quartz substrate 3 by means of electron-beam evaporation. The residual pressure in the evaporation apparatus is less than 10$^{-7}$ mbar. The deposition rate is 1.0 nm/s. In the same apparatus, a 10 nm thick palladium layer 7 is evaporated onto the switching film 5 by means of resistance heating at a deposition rate of 0.2 nm/s. Said switching film 5 has a metallic appearance and is non-transparent.

The sample which is made up of the substrate 3, the switching layer 5 and the palladium layer 7 is arranged in a pressure cell provided with two windows of quartz glass. Said pressure cell also comprises connections for the supply of air and for connecting it to a vacuum pump, respectively. The pressure cell is arranged in the sample room of a spectrophotometer. At wavelengths between 200 and 1000 nm, the transmission T of the sample is less than 0.01%. After evacuation, the pressure cell is filled at room temperature with molecular hydrogen up to a pressure of 1.2 bar (1.2×10$^5$ Pa). The palladium layer 7 forms atomic H which is subsequently absorbed in the switching film 5. Within a few seconds the sample becomes transparent having a transmission of 28%. The layer thus formed comprises a hydride of Gd and Mg with a high hydrogen content: Gd$_{0.8}$Mg$_{0.2}$H$_x$ (x>~2).

Subsequently, the pressure cell is evacuated to a pressure of 10$^{-2}$ mbar (1 Pa). Within 1 s, the transmission decreases from 28% to approximately 5%, and after several tens of seconds, it decreases further to approximately 1%. Next, moist air is admitted at ambient pressure. After several seconds, the transmission has decreased further to below 0.01%. Apparently, the presence of oxygen or moisture has a strong influence on the rate of the dehydrogenation process. In this state, the switching film is mirror-like, and comprises hydrides of Gd and Mg with a low hydrogen content: Gd$_{0.8}$Mg$_{0.2}$H$_x$ (x<~2).

The mirror-like switching film 5 having a very low transmission is converted to a transparent film having a transmission of 28% by renewed exposure to hydrogen. The conversion between both compositions is reversible; an optical switching film is obtained by the supply or discharge of hydrogen.

Figure 2:
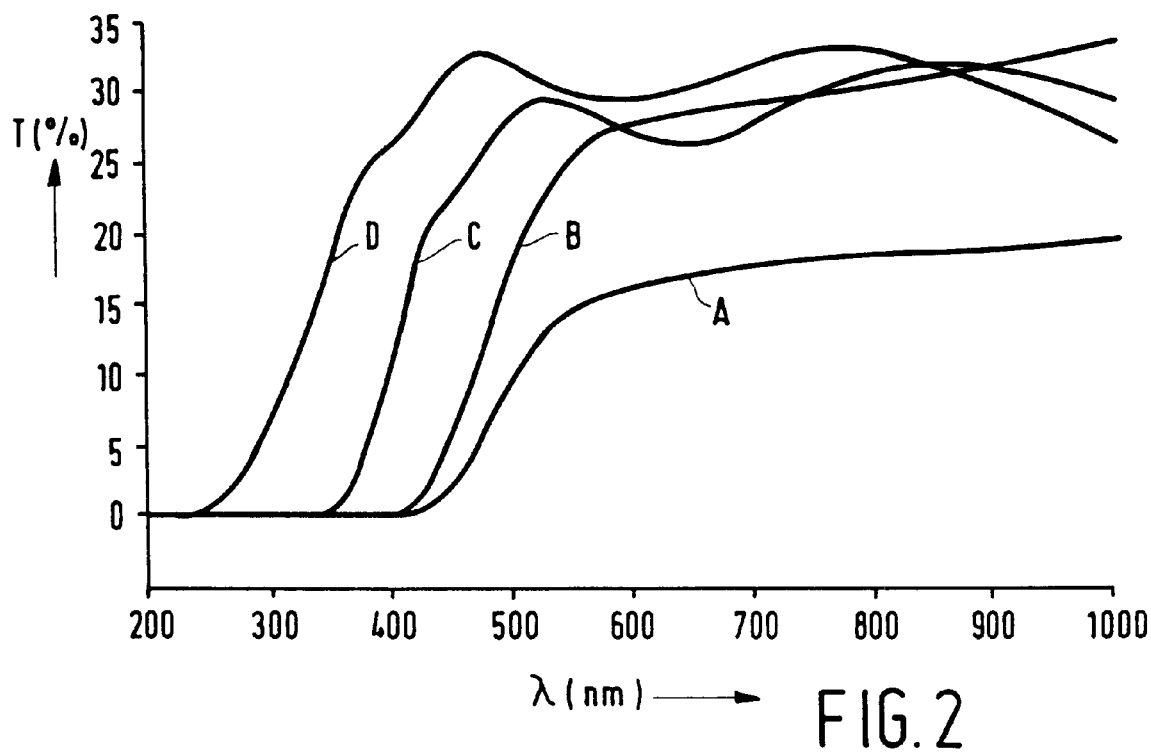
FIG. 2 shows the transmission T (in %) as a function of the wavelength λ (in nm) of a switching device with varying amounts of Mg in a Gd-containing switching film.

FIG. 2 shows the transmission T in % of this and other samples at wavelengths between 200 and 1000 nm in the transparent state. Curve B shows the transmission of the above sample having 20 at. % Mg.

For comparison, curve A shows the transmission of a sample in which the Gd switching film does not contain magnesium. The Figure shows that the addition of 20 at. % Mg to Gd causes an increase in transmission from 16% to 28%. In the non-transparent state, the Mg-containing switching film has a transmission of less than 0.01% at a wavelength of 600 nm. In the non-transparent state, and at the same wavelength, the switching film without Mg shows a transmission of 1%. Consequently, the contrast ratio is increased from 16 to 2800 by the addition of 20 at. % Mg to the switching film.

FIG. 2 also shows the results for samples having switching films with increased amounts of Mg with respect to Gd. Curves C and D show the transmissions of those samples having 50 and 90 at. % Mg respectively. With Mg contents of at least 50 at. %, contrast ratios of more than 3000 can be obtained.

Apart from an increase in transmission as the Mg content increases, the curves also show a shift of the absorption edge to shorter wavelengths. With at least 60 at. % Mg the sample becomes neutral grey in the transparent state, whereas a sample without Mg is yellow in the transparent state.

EXEMPLARY EMBODIMENT 2

Figure 3:
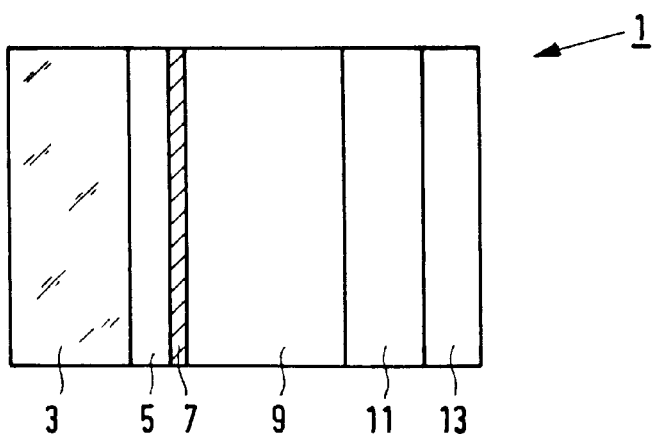
FIG. 3 shows an electro-optical solid-state device according to the invention.

FIG. 3 schematically shows a cross-section of a solid-state electro-optical switching device 1 according to the invention. The layer thicknesses are not drawn to scale.

The device comprises a glass plate 3, a first electrode 5 of $Gd_{0.4}Mg_{0.6}H_x$ as a switching film with a thickness of 200 nm, a palladium layer 7 with a thickness of 5 nm, a 50 μm thick layer 9 of an ion-conducting electrolyte containing KOH, a second electrode 11 of transparent TiOOH with a thickness of 350 nm, and an electroconductive ITO layer 13. All layers are transparent, except film 5 in the mirror-like low-hydrogen state, so that in this state the device 1 acts as a mirror.

The device can operate at room temperature. Layers 5 and 13 are connected to an external current source. By applying a cathodic DC current to the first electrode 5, the low-hydrogen, mirror-like composition is converted to a high-hydrogen composition, which is transparent and neutral grey. TiOOH of the second electrode 11 is converted into $TiO_2$, which is also transparent. The device 1 now acts as a transparent window. When reversing the current, the first electrode 5 returns to the low-hydrogen state which is mirror-like and non-transparent, and the second $TiO_2$ electrode 11 is converted to TiOOH. The device 1 has been switched to a mirror. The switching time is comparable to that of conventional electrochromic devices.

EXEMPLARY EMBODIMENT 3

Figure 4A:
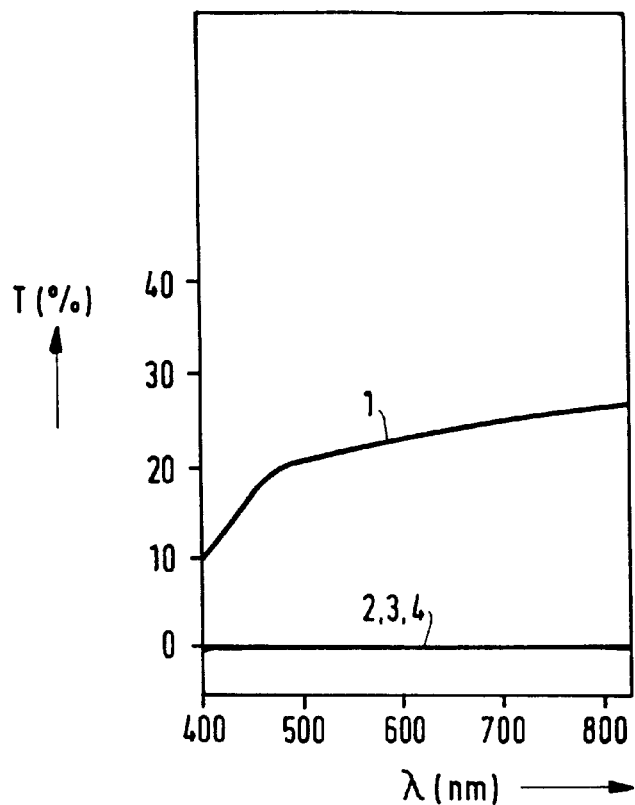
FIGS. 4A and 4B show the transmission and reflection spectra respectively of a switching device according to the invention in several optical states.

Embodiment 1 is repeated with a switching film containing 30 at. % Gd and 70 at. % Mg. FIG. 4A shows the transmission T (in %) as a function of the wavelength λ (in nm) of this sample. Curve 1 shows the transmission of the sample with the switching film in the high-hydrogen transparent state. The colour in the transmission mode is neutral grey. Curve 2 shows the transmission after evacuation and admittance of moist air during a short time. During this process, the hydrogen is desorbed from the switching film. The transmission is about 0.01%, but the sample is violet in reflection. Curve 3, which coincides with curve 2, shows the transmission of the sample after exposure to moist air. In this state the sample is black and absorbing. Curve 4, which coincides with curves 2 and 3, shows the transmission after exposure to moist air for a longer period of time. In this state the sample is mirror-like and also non-transparent.

Figure 4B:
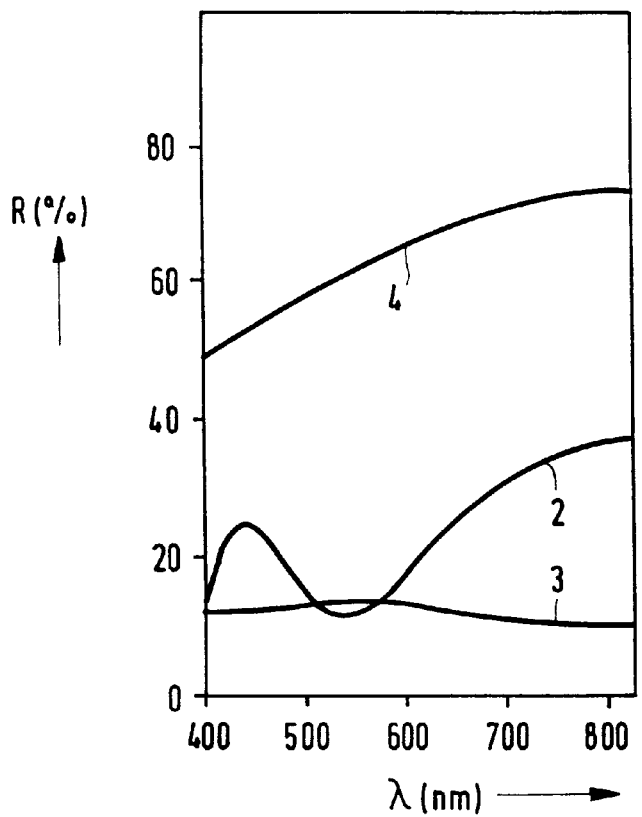

FIG. 4B shows the corresponding reflectance spectra of this sample in the violet absorbing state (curve 2), in the black absorbing state (curve 3), and in the mirror-like state (curve 4). In this Figure, the reflectance R, which is measured through the substrate, is indicated in %.

It follows that with increasing hydrogen content of the switching film, the switching device can show several optical states: mirror-like, absorbing, and transparent. Dependent on the hydrogen content and the thickness of the switching film, this film, when in the absorbing state, can obtain different colours.

The same phenomena can be generated in an electrochemical cell in which the switching film is one of the electrodes. In case of water reduction, the more negative the potential of the switching layer becomes, the more hydrogen is absorbed by the switching film. The switching film will then change from mirror-like, via absorbing, to transparent.

The phenomena as described above are reversible.

The optical switching device in accordance with the invention, which comprises a switching film of hydrides of a trivalent metal and magnesium, such as a gadolinium-magnesium alloy, can be reversibly converted from a mirror-like, non-transparent state to a neutral grey transparent state by exchange of hydrogen. A contrast ratio between the transparent and non-transparent state of at least 3000 can be obtained. Said conversion takes place very rapidly at room temperature. The addition of at least 60 at. % Mg to the trivalent metal leads to a third state restoring the original reflection of the original metal alloy. Such a switching device can be used, inter alia, as an optical switching element, in rear-view mirrors, sun roofs, architectural glass, vision control glass, displays and for display screens with variable transmission.

We claim:

1. An optical switching device comprising a substrate and a switching film which comprises hydrides of an alloy of trivalent metal and magnesium or a multilayer thereof, which hydrides can be reversibly switched from a low-hydrogen, mirror-like composition to a supersaturated, high-hydrogen transparent composition by an exchange of hydrogen.

2. A device as claimed in claim 1, characterized in that the switching film comprises 5 to 95 at. % magnesium with respect to the total metal content.

3. An optical switching device as claimed in claim 1, characterized in that the trivalent metal is gadolinium, lutetium, yttrium or lanthanum.

4. A device as claimed in claim 1, characterized in that the switching film is provided with a catalytically active layer comprising at least one metal selected from the group consisting of palladium, platinum, cobalt and nickel.

5. A device as claimed in claim 1, characterized in that the switching film has a thickness in the range from 20 to 1,000 nm.

6. A device as claimed in claim 1, characterized in that the switching film comprises a hydride of an alloy of the trivalent metal and magnesium, or a multilayer of these elements.

7. A switching device as claimed in claim 1, characterized in that the alloy comprises at least 50 at. % magnesium.

8. A device as claimed in claim 7, characterized in that the hydrides can be reversibly switched via an intermediate opaque composition.

9. The use of a switching device as claimed in claim 1 as a display, optical switching element, mirror with variable transmission, or in architectural glass or sun roofs.

10. An optical switching device comprising a first and a second electrode separated by an ion-conducting electrolyte, the first electrode comprising a switching film of hydrides of a trivalent metal and magnesium, which switching film is provided with an electrocatalytic metal layer in contact with the electrolyte, so that by applying a potential or current between the electrodes a change in optical transmission of the switching layer is detectable when the hydride is electrochemically converted from a low-hydrogen, mirror-like state to a high-hydrogen transparent state by an exchange of hydrogen, and vice versa.

* * * * *